Dec. 2, 1958  H. S. MORGAN  2,862,987
PRIMARY CELL
Filed Oct. 11, 1956

INVENTOR
Harold S. Morgan

BY *M. W. Gould*

ATTORNEY

United States Patent Office 2,862,987
Patented Dec. 2, 1958

2,862,987

PRIMARY CELL

Harold S. Morgan, Columbia, Pa.

Application October 11, 1956, Serial No. 615,409

5 Claims. (Cl. 136—111)

This invention relates to electric current producing cells and more particularly relates to the anode construction of dry cells.

Dry cells having a zinc anode, a cathode of a depolarizer material including an electrolytically reducible oxygen yielding compound and an electrolyte are generally encased in two part metal containers consisting of upper and lower portions. These casings are sealed together after the inclusion of the anode, the cathode and the electrolyte and the battery is then ready for use.

It has been found that after a battery has been in use, or even after a prolonged period of shelf life, in many instances there is a formation of hydrogen gas within the casing developing a pressure which eventually ruptures the case to such an extent that both the gas and the electrolyte escape. An opening of the case at this time reveals that the anode has become coated with zinc oxide and that the electrical connection between the casing and the anode is very poor.

While it was at one time generally believed that the anode reacted with the electrolyte to produce hydrogen which was removed by the action of the depolarizer, this has been proven false in the light of more modern studies of the reactions involved. The current understanding of the mechanism of the production of this hydrogen gas is that the zinc is capable of reducing the electrolyte to hydrogen gas, and since the zinc is continually in contact with the electrolyte the reaction between these substances can take place at all times. One attempted method of counteracting or minimizing this reaction has been the employment of an amalgamation upon the surface of the zinc anode which raises its overvoltage.

We have found that the foregoing problems of hydrogen formation, deterioration of the electrical connection between the anode and the casing, and the eventual rupture of the battery casing, may be effectively minimized and the process of cell manufacture materially expedited if the zinc anode is soldered to the metallic casing with a tin solder.

The anodes in cells of this type normally consist of powdered zinc consolidated into a solid mass and amalgamated with mercury. The tin reacts with the mercury in the anode to provide an amalgamated coating which completely covers those portions of the casing which are exposed to the interior of the battery. The solder rigidly fastens the anode pellet to the casing, provides an initially good electrical contact between the casing and pellet, and prevents any possibility of contact between the electrolyte and that portion of the anode which directly opposes the casing. The tin soldering of the anode to the casing further raises the hydrogen overvoltage of the casing and practically eliminates the formation of hydrogen gas at this point. Once the zinc pellet has been soldered to the anode half of the casing, the cell assembling operation is materially simplified inasmuch as it is no longer necessary to handle a separate anode casing and anode.

It is accordingly a primary object of the present invention to provide an improved primary dry cell wherein the formation of hydrogen at the cell anodes is substantially eliminated and a good electrical contact between the cell casing and anode is maintained throughout the useful life of the cell.

It is another object of the invention to provide an improved primary dry cell having an improved means of mounting the anode within the cell.

It is another object of the invention to provide an improved primary dry cell having its anode secured to the inside of a portion of the metallic cell casing by means of tin solder.

It is still a further object of the present invention to provide an improved method for manufacturing primary dry cells wherein the anode is soldered to a portion of the metallic casing by means of tin solder so as to combine this portion of the casing and the anode into a single cap for ease of handling.

It is a still further object of the present invention to insure by means of soldering a complete connection between the case and the zinc pellet forming the anode to prevent any possibility of contact with the electrolyte of that portion of the zinc anode which directly opposes the casing.

It is a still further object of the present invention to provide a coating for the casing of the battery adjacent to the anode which will raise the hydrogen overvoltage of the casing and practically eliminate the formation of hydrogen gas within the casing.

It is a still further object of the present invention to provide a means for attaching the zinc pellet forming the anode to that portion of the casing containing the anode, so that during the assembling operation the difficulty of handling two separate pieces of the case and the anode is reduced to the ease of handling the single cap of the casing which has the anode firmly soldered thereto.

It is a still further object of the present invention to thoroughly coat that portion of the case between the anode and the case with an amalgamated tin solder which will protect the casing from contact with the electrolyte, thus raising the hydrogen overvoltage of the case and practically eliminating the formation of hydrogen gas within the casing and at the same time protecting that portion of the anode facing the casing against the formation of zinc oxide, thus assuring a good electrical connection between the casing and the anode.

The invention is illustrated in the accompanying drawing in which.

Figure 1:
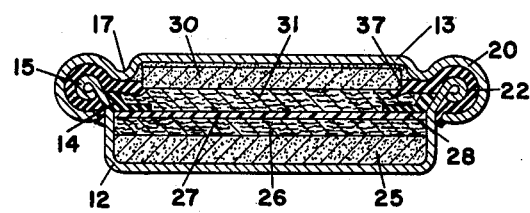
Figure 1 is a cross section through a primary cell with a slight exaggeration of the coating of solder between the anode and the casing.
Figure 2:
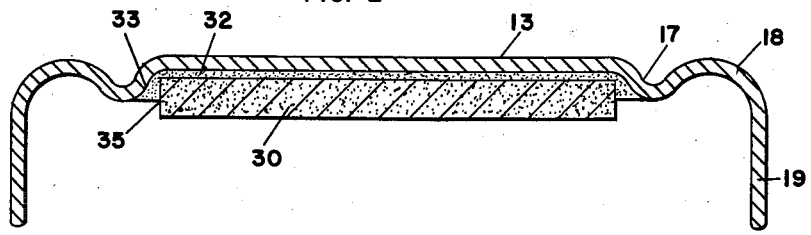
Figure 2 is an enlarged cross sectional view of the cap with the exaggeration of the soldered connection.

Referring particularly to the drawings, there is shown a disk type alkaline primary cell of the same general type as is disclosed in assignee's application Serial No. 548,660. As disclosed in that application, such cells may conventionally consist of a zinc anode, a mercuric oxide depolarizing cathode, and a potassium hydroxide electrolyte. The case of the cell of Figures 1 and 2 is made up of a bottom casing 12 and a cap 13. The bottom casing 12 is formed with a flared rim 14 terminating in a rolled edge 15. The cap 13 is formed with an annular groove 17 and a rounded rim 18 terminating in a comparatively long downwardly extending side 19. The side 19 is rolled around the rim 15 as shown at 20. A gasket 22 is positioned between the rim 15 and the rolled sides 20.

The bottom of the casing has the usual cathode 25, an absorbent pad 26 containing an electrolyte, a barrier screen 27, a hold-down washer 28, a second electrolyte pad 31, and an anode 30. This construction is the same as that discussed in greater detail in assignee's applications Serial Nos. 550,565 and 558,151.

The anode 30, which may be a consolidated pellet of powdered amalgamated zinc, fits into that portion of the cap 13 which is defined within the annular groove 17. Between the zinc pellet 30 and the casing 13 there is a coating of tin solder 32 which extends down and contacts the inward edges 33 of the groove 17 and the outer edges 35 of the zinc pellet, completely sealing the zinc pellet within that area of the case defined by the annular groove.

The soldering operation is accomplished by placing a small piece of tin solder between the pellet of zinc and the cap and applying heat by resistance soldering to melt the tin solder. This operation causes the solder to flow evenly within the space defined by the annular groove and firmly affix the zinc pellet to the casing, while at the same time completely covering that portion of the casing defined by the annular groove with a coating of tin which then amalgamates with the mercury in the zinc pellet.

This coating of amalgamated tin prevents contact between that portion of the casing bounded by the groove and the electrolyte. The amalgamated tin coating raises the hydrogen overvoltage of the metallic casing and prevents the formation of hydrogen gas, generally formed by contact of the electrolyte with the metallic casing. This prevents the generation of pressure within the case and the danger of eventual rupture of the case. This is particularly true in the case of small batteries designed for use in hearing aids, electric watches, and other applications where size is of the utmost importance. In the particular instance of an electric watch the battery is considerably smaller than a ten cent piece and the presence of a small amount of gas quickly builds tremendous pressures within the casing of the battery. The rupture of a battery case within the confines of an electric watch obviously renders the watch useless as a timepiece and in some instances destroys its value completely.

A washer 22 shown in Figure 1 between the rolled edges 20 of the cap and the rim 15 of the casing firmly abuts against the zinc anode as shown at 27 and provides electrolyte protection for that portion of the casing beyond and including the annular groove. This prevents contact between the electrolyte and that portion of the casing including the groove and beyond, thus making it possible for the electrolyte to reach the case only through the porous zinc pellet. However, the amalgamated tin solder coating positively prevents contact between the electrolyte and that portion of the case not covered by the sealing washer 22.

The assembly of small batteries is greatly facilitated by lessening the number of parts which it is necessary to handle. It is thus a material advantage to the person assembling the parts to have the zinc pellet firmly and securely attached to the cap. With the soldering of the zinc pellet to the casing the handling of two pieces is changed to the handling of the single cap, thus greatly facilitating the assembling operation.

It will thus be seen that the amalgamated tin solder firmly securing the zinc pellet to the cap of the battery casing provides a more perfect electrical connection between the anode and the casing both initially and after the passage of time, it secures the pellet to the casing during the assembly of the battery to facilitate cell assembly, it protectively coats that portion of the casing not covered by the protective washer and effectively prevents contact with the electrolyte, and it raises the hydrogen overvoltage of the casing to prevent the formation of hydrogen gas within the casing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed and desired to be secured by United States Letters Patent is:

1. A primary cell comprising a metal cap portion and casing portion secured together, a cathode and electrolyte contained in said casing portion, and a metallic anode contained within the cap portion and soldered thereto with tin solder.

2. A primary cell comprising metal cap and casing portions sealed together, a cathode and electrolyte contained in said casing portion, the cap portion having a substantially flat section bounded by a raised ridge, an anode mounted against said flat section and within said ridge, said anode being soldered to said flat section by tin solder which fills said flat section substantially to the most raised portion of said ridge.

3. A primary cell comprising a casing, a metal cap, said cap being formed with a central annular inwardly open depression, a cathode and an electrolyte contained within said casing, a metallic anode fitting into said annular depression in said cap, and a soldering medium carried between said anode and said cap and completely coating the cap between said anode and said cap metal and firmly affixing said anode to said cap.

4. A primary cell according to claim 3, wherein the anode consists of powdered zinc with 10% mercury and the soldering medium consists of a tin solder which during the soldering operation forms an amalgam with the mercury in the anode to coat the metal of the cap and increase the hydrogen overvoltage of the cap metal.

5. A primary cell comprising a casing, a metal cap, said cap being formed with a central annular inwardly open depression, a cathode and an electrolyte in said casing, a sealing washer attached to said cap and extending from the outer edge to the rim of the depression, an anode fitting within said depression and a soldering medium firmly affixing said anode to said cap and coating the exposed portions of said cap not covered by said sealing washer.

References Cited in the file of this patent

UNITED STATES PATENTS

| | | |
|---|---|---|
| 2,509,249 | Rhodes | May 30, 1950 |
| 2,536,697 | Ruben | Jan. 2, 1951 |
| 2,542,710 | Ruben | Feb. 20, 1951 |
| 2,650,945 | Herbert | Sept. 1, 1953 |